United States Patent
Fritz-Langhals et al.

(10) Patent No.: US 10,336,866 B2
(45) Date of Patent: Jul. 2, 2019

(54) METHOD FOR PRODUCING ORGANOSILICON COMPOUNDS HAVING AMINO GROUPS

(71) Applicant: Wacker Chemie AG, Munich (DE)

(72) Inventors: Elke Fritz-Langhals, Ottobrunn (DE); Alfred Popp, Unterhaching (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 15/514,885

(22) PCT Filed: Apr. 6, 2016

(86) PCT No.: PCT/EP2016/057471
§ 371 (c)(1),
(2) Date: Mar. 28, 2017

(87) PCT Pub. No.: WO2016/173811
PCT Pub. Date: Nov. 3, 2016

(65) Prior Publication Data
US 2018/0230273 A1    Aug. 16, 2018

(30) Foreign Application Priority Data
Apr. 27, 2015   (DE) .................... 10 2015 207 673

(51) Int. Cl.
*C08G 77/26*   (2006.01)
*C08L 83/04*   (2006.01)

(52) U.S. Cl.
CPC ............. *C08G 77/26* (2013.01); *C08L 83/04* (2013.01)

(58) Field of Classification Search
CPC ......... C08G 77/16; C08G 77/26; C08K 5/544
See application file for complete search history.

(56) References Cited

U.S. PATENT DOCUMENTS

| | | | |
|---|---|---|---|
| 4,633,002 A | 12/1986 | Piskoti | |
| 5,360,361 A | 11/1994 | Bechtel et al. | |
| 5,461,134 A | 10/1995 | Leir et al. | |
| 6,284,860 B1 | 9/2001 | Sommer et al. | |
| 7,238,768 B2 | 7/2007 | Hupfield et al. | |
| 9,273,072 B2 | 3/2016 | Fritz-Langhals | |
| 2005/0085612 A1* | 4/2005 | Schafer | C08G 77/26 528/34 |
| 2006/0020097 A1 | 1/2006 | Briehn et al. | |
| 2006/0036055 A1 | 2/2006 | Schafer et al. | |
| 2011/0301374 A1 | 12/2011 | Selbertinger et al. | |
| 2015/0112092 A1* | 4/2015 | Fritz-Langhals | C07F 7/1804 556/413 |

FOREIGN PATENT DOCUMENTS

| | | | |
|---|---|---|---|
| DE | 2500020 A1 | | 7/1976 |
| EP | 0580215 A1 | | 1/1994 |
| EP | 0628589 A1 | | 12/1994 |
| EP | 0739372 B1 | | 12/1998 |
| JP | 2005517749 A | | 6/2005 |
| JP | 2006521420 A | | 9/2006 |
| JP | 2006526668 A | | 11/2006 |
| WO | 03068845 A1 | | 8/2003 |
| WO | 2013160104 | * | 10/2013 |
| WO | 2013160104 A1 | | 10/2013 |

OTHER PUBLICATIONS

Berkefeld et al. (Organometallics (2014) 33(11) 2721-2737).*
International Search Report from corresponding PCT/EP2016/057471 dated Jun. 10, 2016.
PatBase Abstract for DE2500020 dated Apr. 4, 2018.

* cited by examiner

*Primary Examiner* — Kuo Liang Peng
(74) *Attorney, Agent, or Firm* — Caesar Rivise, PC

(57) ABSTRACT

The object of the invention is therefore to provide a method for the preparation of amino-functional polyorganosiloxanes, in which (A) organosiloxanes containing Si—OH groups are reacted with (B) at least stoichiometric amounts of monoalkoxy(aminoalkyl) silanes with respect to the Si—OH groups, wherein catalytically active additives selected from acid, base or metal-organic compound are used in amounts of less than 0.1 ppm acid, less than 30 ppm base and less than 0.4% metal-organic compound.

13 Claims, No Drawings

METHOD FOR PRODUCING ORGANOSILICON COMPOUNDS HAVING AMINO GROUPS

CROSS-REFERENCE TO RELATED APPLICATIONS

This application is a U.S. National Phase Application of PCT/EP2016/057471, filed Apr. 6, 2016, which claims priority from DE 10 2015 207 673.3 filed Apr. 27, 2015, the contents of which applications are incorporated herein by reference in their entireties for all purposes.

BACKGROUND OF THE INVENTION

The invention relates to a method for catalyst-free production of amino-containing organosilicon compounds having a minimal proportion of Si—OH and Si—OR moieties by use of (aminoalkyl)alkoxysilanes.

Aminoalkylpolysiloxanes are widely used in industry. For instance, block copolymers are obtainable via polyaddition by use of isocyanates. A multiplicity of products having custom-tailored properties are thus obtainable by combining various polymeric blocks. Purity is very important for the aminoalkylpolysiloxanes used to construct block copolymers. Chain ends have to be highly amino-functionalized or high molecular weights cannot be achieved for the block copolymers.

Methods for preparing aminoalkylpolysiloxanes are already known.

Equilibration methods using 1,3-bis(3-aminopropyl)tetramethyldisiloxane are described in U.S. Pat. No. 5,461,134 and in EP-B-0739372. These methods are inconvenient in that they require long reaction times. Equilibration methods also have the in-principle disadvantage that the products obtained have a comparatively high silanol fraction. Si—OH chain ends act, however, as chemically labile chain stoppers in a subsequent reaction with diisocyanates and thereby prevent the attainment of high molecular weights. A further disadvantage of unconverted Si—OH chain ends being present in the aminoalkylpolysiloxanes is that they can be the starting point for hydrolytic chain degradation. Materials of this type accordingly display lower stability in the presence of moisture.

US-A-2011/301374 describes a method whereby remaining Si—OH chain ends may be reacted with silazanes and thereby converted into the corresponding aminoalkyl groups. The achievement of high conversions, accordingly, requires two reaction steps; this greatly adds to the cost of production.

U.S. Pat. No. 4,633,002 describes a method for producing aminoalkylpolysiloxanes wherein silanol-terminated siloxanes are reacted with aminofunctional trialkoxysilanes in the presence of 0.4 to 1% of organometallic catalysts, in particular tin compounds.

This method is disadvantageous on account of the required high temperatures of about 275° C. which, as reported therein, lead to yellowing of the reaction product due to decomposition processes.

EP-A-0628589 describes a method for producing aminoalkylpolysiloxanes from silanol-terminated siloxanes, aminofunctional dialkoxysilanes and at least 0.01 to 1% of a combination between the basic catalysts barium hydroxide or strontium hydroxide on the one hand and sodium borate and/or sodium phosphate on the other. Especially the toxicity of the heavy metals barium and strontium is prejudicial to any industrial use of this method.

EP-A-1580215 describes a method for producing aminoalkylpolysiloxanes from silanol-terminated siloxanes and amino-functional dialkoxysilanes in the presence of 30 to 200 ppm of the basic catalysts sodium hydroxide, sodium methoxide or sodium siloxide.

U.S. Pat. No. 7,238,768 describes the production of aminofunctional polysiloxanes by reaction of hydroxyl-functional polysiloxanes with a deficiency of aminofunctional silanes, based on the Si—OH groups used, and in the presence of carboxylic acids. According to the prescription disclosed therein, the reaction of the (aminoalkyl)alkoxysilane with the Si—OH groups is accompanied by an in situ reaction of the Si—OH groups with the added alcohol to form Si—O-alkyl groups.

As stated therein, the aminoalkylpolysiloxanes obtained all without exception contain both Si—OH and Si—O-alkyl groups.

According to the prescription disclosed in U.S. Pat. No. 7,238,768, the reaction of the (aminoalkyl)alkoxysilane with the Si—OH groups (the actual chain-stopping reaction) is also accompanied by a chain-extending reaction of Si—OH units with Si—OH units, which eliminates water and which is likewise catalyzed by action of the acidic catalyst.

EP-A-1580215 further reports that the conditions disclosed in U.S. Pat. No. 7,238,768 result in the formation of products that have a yellow color and a short shelf life.

The method is accordingly unsuitable for producing amino-functional polysiloxanes having a minimal proportion of Si—OH groups and Si—O-alkyl groups. Not only the Si—OH groups but also the Si—O-alkyl groups act as a labile chain stopper since the latter, when stored in the presence of atmospheric humidity, gradually convert into Si—OH groups by hydrolysis and liberate volatile alcohols in the process, while the Si—OH groups thus generated have the abovementioned disadvantages.

The method is also unsuitable for producing aminofunctional polysiloxanes having a constant molecular weight, since chain condensation results in the formation of products of distinctly increased molecular weight. But a constant chain length is very important for the abovementioned uses in block copolymers, since it is responsible for the physical properties of the materials obtained.

Yellowing and reduced shelf life likewise reduce product quality.

U.S. Pat. No. 6,284,860 describes the reaction of OH-terminated organopolysiloxanes with di- and trialkoxy (aminoalkyl)silanes in the presence of Brønstedt or Lewis acids to form organopolysiloxanes containing about 30 to 60% of Si—O-alkyl groups.

According to the prescription given in U.S. Pat. No. 6,284,860, the reaction requires, based on the Si—OH groups present, at least stoichiometric amounts of the acid, which then remain in the reaction product as amine salts.

This method is accordingly unsuitable for producing amino-functional polysiloxanes having a minimal proportion of Si—O-alkyl groups. It is also unsuitable because the resultant high salt contents lead to inferior physical properties—such as rheology and visual transparency, for example—for the target products.

WO2013/160104 describes a method for producing amino-containing organosilicon compounds having a minimal proportion of Si—OH and Si—OR moieties by use of (aminoalkyl)monoalkoxysilanes in the presence of catalytic amounts of an acid. The method described therein is suitable for preparing aminoalkylpolysiloxanes which by virtue of their high purity have in-principle suitability for the uses mentioned at the outset.

Yet, particularly in the production of high molecular weight aminoalkylpolysiloxanes, even just very minimal amounts of the catalyst can have an adverse effect on the transparency of the material. A frequent haze due to the very finely divided catalyst is also still observable in the descendent products. Dehazing a high molecular weight and hence highly viscous material is technically far from straightforward. In many cases, haze appears with a time delay in the course of the storage of the material, meaning an unavailability of a consistently high quality of the material for the further reaction.

DESCRIPTION OF THE INVENTION

The invention accordingly provides a method for producing aminofunctional polyorganosiloxanes which comprises reacting (A) organosiloxanes which contain Si—OH groups with (B) at least stoichiometric amounts of monoalkoxy (aminoalkyl)silanes, based on the Si—OH groups, while utilizing catalytically active admixtures selected from acid, base or organometallic compound in amounts of less than 0.1 ppm of acid, less than 30 ppm of base and less than 0.4% of organometallic compound.

The inventors found that, surprisingly, aminoalkylpolysiloxanes having a minimal proportion of Si—OH groups and Si—O-alkyl groups are obtainable by reaction of hydroxypolysiloxanes (A) with at least stoichiometric amounts of monoalkoxy(aminoalkyl)silanes (B). Catalytically active admixtures are not required here.

The aminofunctional polyorganosiloxanes obtained preferably have a proportion of Si—OH groups and Si—O-alkyl groups of together less than 5 mol % based on the aminoalkyl groups.

The method of the invention is simple to carry out and leads to products of high purity. Concurrent reactions, such as the formation of Si—O-alkyl groups for example, only take place to a quite minimal extent. The chain length of the polysiloxane remains essentially unchanged except for the chain-stopping units which become attached. Chain condensation reactions only take place to an insignificant degree, if at all. The amino-functional polysiloxanes obtained are clear and colorless. Nor do they subsequently develop haze or become colored in the course of a prolonged period of storage for weeks by virtue of the absence of catalytically active admixtures in particular.

Preferably, aminofunctional polysiloxanes of general formula I

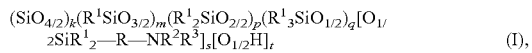

are obtained by reaction of organosiloxanes of general formula (II)

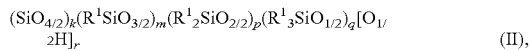

with at least the stoichiometric amount of a monoalkoxy (aminoalkyl)silane of general formula (III)

where

R is an unsubstituted or halogen-substituted alkylene radical of 1 to 12 carbon atoms, $R^x$ is hydrogen, an unsubstituted $C_1$-$C_{10}$ hydrocarbyl radical or a $C_1$-$C_{10}$ hydrocarbyl radical substituted with substituents selected from —CN and halogen, $R^1$ is a hydrogen atom or a $C_1$-$C_{20}$ hydrocarbyl or $C_1$-$C_{15}$ hydrocarbyloxy radical which is bonded Si—C and is unsubstituted or substituted with substituents selected from —CN, $NR^x{}_2$, COOH, $COOR^x$, -halogen, -acryloyl, -epoxy, —SH, —OH and —$CONR^x{}_2$ and in each of which one or more mutually nonadjacent methylene units at a time may be replaced by groups —O—, —CO—, —COO—, —OCO— or —OCOO—, —S—, or $NR^x$ and in each of which one or more mutually nonadjacent methine units may be replaced by groups —N=, —N=N—, or —P=, $R^2$ and $R^3$ are each hydrogen or unbranched, branched or cyclic saturated or unsaturated alkyl of 1 to 12 carbon atoms or aryl or aralkyl where individual nonadjacent methylene units may be replaced by nitrogen atoms or oxygen atoms, $R^4$ is linear or branched alkyl of 1 to 8 carbon atoms where nonadjacent methylene units may be replaced by oxygens, s is not less than 1, r is not less than 1, s+t is equal to the value of r, and k+m+p+q is not less than 2, and s:t is not less than 10.

Alkylene radical R may be unbranched, branched or cyclic, saturated or unsaturated. R is preferably a divalent unbranched or branched saturated alkylene radical of 1 to 8 carbon atoms, more preferably of 2 to 4, most preferably of 3, carbon atoms, more preferably an n-propylene group.

$R^1$ is preferably of 1 to 12 atoms, especially of 1 to 6 atoms, preferably carbon atoms only or one alkoxy oxygen atom and otherwise carbon atoms only. Preferably, $R^1$ is a straight-chain, branched or cyclic $C_1$-$C_6$ alkyl radical. The radicals methyl, ethyl, phenyl, vinyl and trifluoropropyl are particularly preferable.

Preferably, $R^2$ and $R^3$ are each independently hydrogen or unbranched, branched or cyclic saturated or unsaturated alkyl of 1 to 6 carbon atoms or aryl, where nonadjacent methylene units may be replaced by nitrogen atoms or oxygen atoms.

More preferably, $R^2$ and $R^3$ are each independently hydrogen or $C_1$-$C_5$ alkyl where individual nonadjacent methylene groups may be replaced by nitrogen atoms.

Most preferably, $R^2$ and $R^3$ are each hydrogen.

Preferably, $R^4$ is a linear or branched alkyl group of 1 to 5 carbon atoms where preferably 1 to 2 nonadjacent methylene units may be replaced by oxygens.

Alkyl groups of 1 to 5 carbon atoms are particularly preferable and it is particularly preferable for one methylene group to be replaced by oxygen.

Examples of radicals $R^4$ are methyl, ethyl, n-propyl, i-propyl, 2-methoxyethyl and 2-methoxypropyl.

Preferably, the proportion of Si—OH groups in the compounds of general formula I is minimal in relation to the proportion of aminofunctional alkyl groups. Preferably, the ratio s:t in general formula I is not less than 20 and more preferably not less than 50.

The aminofunctional organosiloxane of general formula I may be linear, cyclic or branched.

The sum total of k, m, p, q, s and t is preferably a number from 10 to 100 000, especially from 20 to 20 000.

Preferred branched organosiloxanes are the organosilicone resins which, in accordance with general formula I, contain T- and Q-units, i.e., k+m>0. Particular preference is given to resins wherein k+m is not less than 5% and not more than 90% based on the sum total of k, m, p, q, s and t.

Preferred linear aminofunctional organosiloxanes are the terminally aminofunctionalized organosiloxanes of general formula (Ia),

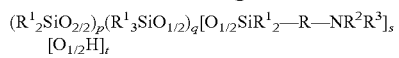

where s+t+q=2,
where q may be 0 or 1.
p is preferably from 20 to 50 000, especially from 50 to 2000.

Particularly preferable linear aminofunctional organosiloxanes are the α,ω-terminally aminofunctionalized organosiloxanes where q=0 and s+t=2.

Catalytically active admixtures in the process are not just unnecessary but actually undesired. Acid is to be understood as meaning Brønstedt acids and Lewis acids, especially Brønstedt acids having $pK_a$ values up to +5. Base is to be understood as meaning specifically metal hydroxides, metal oxides, metal alkoxylates and metal siloxides. Organometallic compound is to be understood as meaning specifically organotin compounds.

It is preferable to utilize less than 0.01 ppm of acid. It is preferable to utilize less than 10 ppm of base. It is preferable to utilize less than 0.1% of organometallic compound. In particular, the process is carried out without catalytically active admixtures.

Temperatures at which the method is conducted are preferably not less than 50° C. and more preferably not less than 90° C. and not more than 200° C. and more preferably not more than 150° C.

The method is preferably carried out under atmospheric pressure or under reduced pressure. Particularly preferred pressures range between not more than 500 mbar and 1 mbar.

The method of the invention may be carried out as a batch reaction, as a semi-batch reaction or in a continuous manner. For example, the reaction components may be mixed at ambient temperature and the mixture heated to the reaction temperature. The reaction is preferably carried out by commixing. Methods of mixing which are familiar to a person skilled in the art may be employed here. Stirring may be used to effect the commixing for example.

In one preferred embodiment, the alcohol liberated in the course of the reaction is removed from the reaction mixture during or after the reaction. Removal is preferably effected by distillation, for example by distillation under reduced pressure. Distillation techniques familiar to a person skilled in the art may be used for this purpose, examples being equilibrium distillation through a column, short path distillation or thin film evaporation.

The reaction of the invention may also be carried out in a continuous manner. Technical implementations familiar to a person skilled in the art are suitable here, examples being tubular reactors, loop reactors or stirred tank batteries.

Particularly the reaction of high molecular weight polysiloxanes is hastened on employing an excess of aminofunctional alkoxysilane. Since, in these systems, the required weight fraction of silane is quite minimal, the excess does not significantly affect the economics of the process. Using, for example, a hydroxypolysiloxane of general formula 1a with a molecular weight of 14 000, the stoichiometrically required amount of 3-aminopropyldimethylmethoxysilane is only about 2% by weight of the overall reaction mass.

The monoalkoxy(aminoalkyl)silane (B) is preferably used in a molar amount of not less than 1.2 and not more than 10 equivalents based on Si—OH units present, more preferably in molar proportions of not less than 1.5 and not more than 5 equivalents, based on Si—OH units present in the organosiloxane (A).

A computation of the excess in which the (aminoalkyl)alkoxysilane (B) used has to be used to achieve complete conversion must take account of the amount of water present in the hydroxypolysiloxane (A), since the (aminoalkyl)alkoxysilane (B) is consumed by water to form the corresponding disiloxane. This is simple to remove by devolatilizing the reaction mixture after the reaction.

The reaction may utilize further components, for example solvents, in amounts of not less than 1% and not more than 200%, preferably not less than 10% and not more than 100%, based on the overall reaction mass. When solvents are used, the preference is for solvents or solvent mixtures having a boiling point/range of up to 120° C. at 0.1 MPa. Examples of solvents include ethers such as methyl tertbutyl ether, tetrahydrofuran or dioxane, nitriles such as acetonitrile or propionitrile, DMSO, hydrocarbons such as, for example, heptane, methylcyclohexane or toluene.

The above symbols in the above formulae each all have their meanings independently of each other. The silicon atom is tetravalent in all formulae.

In the examples which follow, amounts and percentages are all by weight, pressures are all 0.10 MPa abs. and temperatures are all 20° C., unless specifically stated otherwise. The examples are all carried out under inertization and/or protective gas.

EXAMPLE 1

100 g of α,ω-bishydroxy-terminated polydimethylsiloxane having an $M_n$ of 13 810 g/mol, as determined by $^1$H NMR spectroscopy, corresponding to 7.24 mMol of Si—OH groups, and a water content of 115 ppm, corresponding to 0.64 mmol, determined by Karl Fischer titration, are heated to 140° C. At this temperature and about 100 mbar pressure, 3.2 g (21.7 mMol, corresponding to 1.50 equivalents based on Si—OH) of 99 percent 3-aminopropyldimethylmethoxysilane are added and the methanol formed is collected as distillate in a cooled receiver. Following an overall reaction time of 1 hour, the reaction product—the α,ω-bisaminopropyl-terminated polydimethylsiloxane—is analyzed by NMR spectroscopy. No Si—OH moieties are detectable. The product still contains 21 mol % of 3-aminopropyldimethylmethoxysilane based on the molar amount of aminopropyl end groups of the polysiloxane. The pressure is lowered to about 1 mbar to remove excess silane and methanol from the product. The product is a clear and colorless liquid.

EXAMPLE 2

Example 1 is repeated using 200 g (14.5 mmol) of α,ω-bishydroxy-terminated polydimethylsiloxane having an $M_n$ of 13 810 g/mol and 4.7 g (32 mmol, 1.1 equivalents) of silane. The overall reaction time is 4 hours.

The reaction product at the end of the reaction contains, based on the molar amount of aminopropyl end groups, 0.6 mol % of Si—OH end groups. The pressure is lowered to about 1 mbar to remove traces of excess silane and methanol from the product. The product is a clear and colorless liquid.

EXAMPLE 3

Example 2 is repeated using 5.5 g (37.7 mmol, 1.3 equivalents) of silane at 140° C./60 mbar. The overall reaction time is 2 hours.

The reaction product at the end of the reaction contains, based on the molar amount of aminopropyl end groups, 1.3 mol % of Si—OH end groups and additionally 7.4 mol % of unconverted silane. The pressure is lowered to about 1 mbar to remove this together with methanol from the product. The product is a clear and colorless liquid.

The invention claimed is:

1. A method for producing aminofunctional polyorganosiloxanes of general formula I

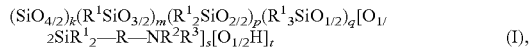 (I), which comprises reacting (A) organosiloxanes which contain Si—OH groups, of general formula (II)

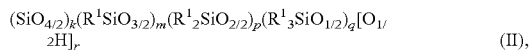 (II), with (B) at least a stoichiometric amount of a monoalkoxy(aminoalkyl)silane, based on the Si—OH groups, of general formula (III)

 (III), while utilizing less than 0.01 ppm of acid, less than 30 ppm of base and less than 0.4% of organometallic compound, wherein R is an unsubstituted or halogen-substituted alkylene radical of 2 to 12 carbon atoms, $R^x$ is hydrogen, an unsubstituted $C_1$-$C_{10}$ hydrocarbyl radical or a $C_1$-$C_{10}$ hydrocarbyl radical substituted with substituents selected from —CN and halogen, $R^1$ is a hydrogen atom or a $C_1$-$C_{20}$ hydrocarbyl or $C_1$-$C_{15}$ hydrocarbyloxy radical which is bonded Si—C and is unsubstituted or substituted with substituents selected from —CN, $NR^x_2$, COOH, $COOR^x$, -halogen, -acryloyl, -epoxy, —SH, —OH and —$CONR^x_2$ and in each of which one or more mutually nonadjacent methylene units at a time may be replaced by groups —O—, —CO—, —COO—, —OCO— or —OCOO—, —S—, or $NR^x$ and in each of which one or more mutually nonadjacent methine units may be replaced by groups —N═, —N═N—, or —P═, $R^2$ and $R^3$ are each hydrogen or unbranched, branched or cyclic saturated or unsaturated alkyl of 1 to 12 carbon atoms or aryl or aralkyl where individual nonadjacent methylene units may be replaced by nitrogen atoms or oxygen atoms, $R^4$ is linear or branched alkyl of 1 to 8 carbon atoms where nonadjacent methylene units may be replaced by oxygens, s is not less than 1, r is not less than 1, s+t is equal to the value of r, and k+m+p+q is not less than 2, and s:t is not less than 10.

2. The method as claimed in claim 1, wherein $R^1$ is a straight-chain, branched or cyclic $C_1$-$C_6$ alkyl radical.

3. The method as claimed in claim 2, wherein $R^2$ and $R^3$ are each hydrogen.

4. The method as claimed in claim 3, wherein $R^4$ is alkyl of 1 to 5 carbon atoms.

5. The method as claimed in claim 4, wherein less than 0.01 ppm of acid is present.

6. The method as claimed in claim 5, conducted at temperatures of 50° C. to 150° C.

7. The method as claimed in claim 6, wherein said monoalkoxy(aminoalkyl)silane (B) is used in a molar amount of not less than 1.2 and not more than 10 equivalents based on Si—OH units present in said organosiloxane (A).

8. The method as claimed in claim 1, wherein $R^2$ and $R^3$ are each hydrogen.

9. The method as claimed in claim 1, wherein $R^4$ is alkyl of 1 to 5 carbon atoms.

10. The method as claimed in claim 1, wherein less than 0.01 ppm of acid is present.

11. The method as claimed in claim 1, conducted at temperatures of 50° C. to 150° C.

12. The method as claimed in claim 1, wherein said monoalkoxy(aminoalkyl)silane (B) is used in a molar amount of not less than 1.2 and not more than 10 equivalents based on Si—OH units present in said organosiloxane (A).

13. The method as claimed in claim 1, wherein the reacting is conducted without catalysts.

* * * * *